No. 706,507. Patented Aug. 5, 1902.
W. F. FOLMER.
PHOTOGRAPHIC SHUTTER.
(Application filed May 9, 1902.)
(No Model.) 2 Sheets—Sheet 1.
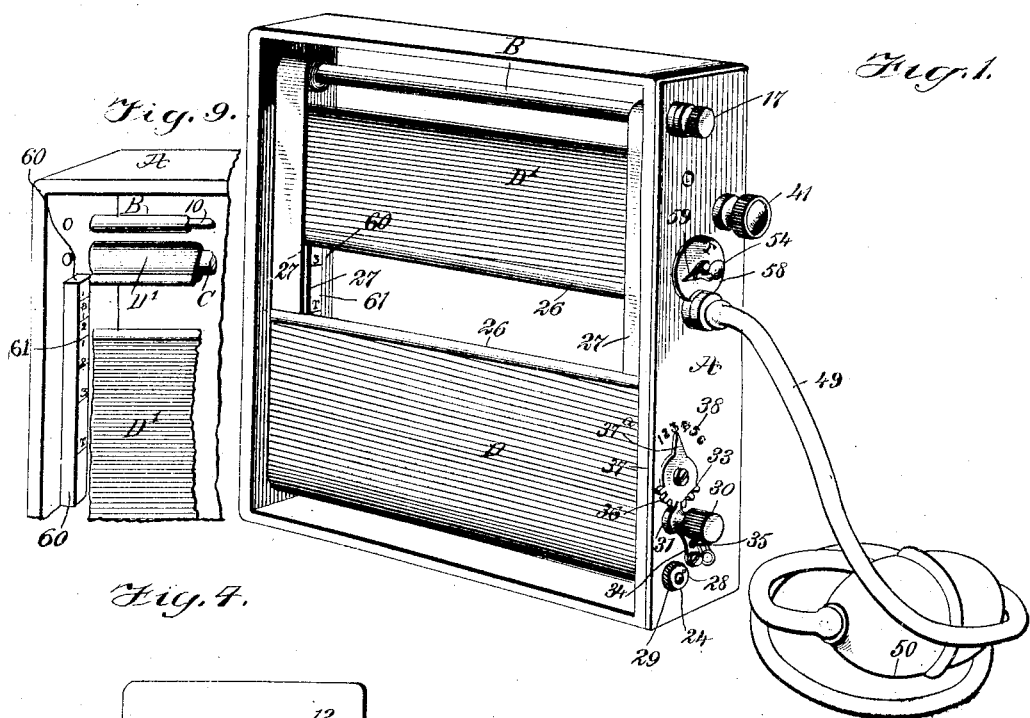
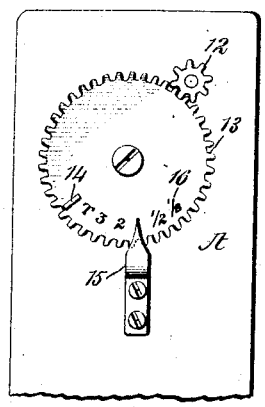
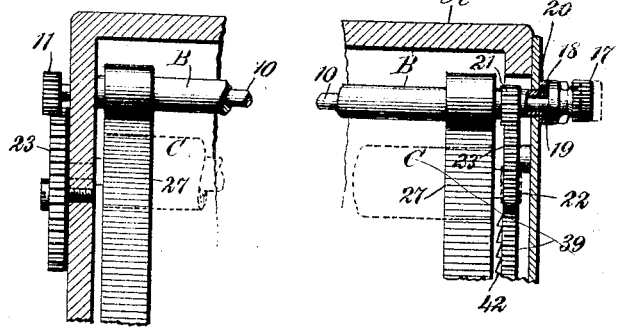
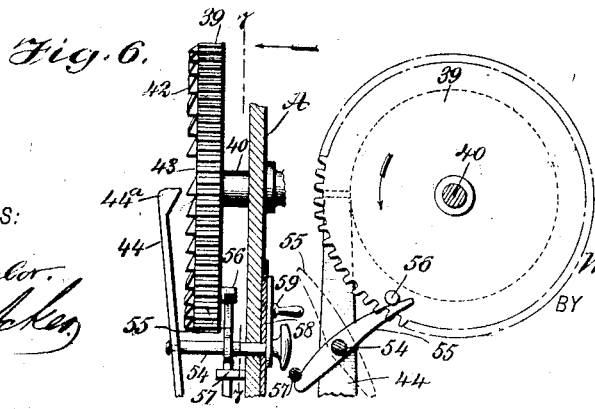
WITNESSES:
INVENTOR
William F. Folmer
BY
Munn & Co
ATTORNEYS.

No. 706,507. Patented Aug. 5, 1902.
W. F. FOLMER.
PHOTOGRAPHIC SHUTTER.
(Application filed May 9, 1902.)

(No Model.) 2 Sheets—Sheet 2.

WITNESSES:
Geo W Naylor
J Wedeker

INVENTOR
William F. Folmer
BY Munn
ATTORNEYS.

UNITED STATES PATENT OFFICE.

WILLIAM F. FOLMER, OF NEW YORK, N. Y.

PHOTOGRAPHIC SHUTTER.

SPECIFICATION forming part of Letters Patent No. 706,507, dated August 5, 1902.

Original application filed February 17, 1902, Serial No. 94,475. Divided and this application filed May 9, 1902. Serial No. 106,621. (No model.)

*To all whom it may concern:*

Be it known that I, WILLIAM F. FOLMER, a citizen of the United States, and a resident of the city of New York, borough of Manhattan, in the county and State of New York, have invented a new and Improved Photographic Shutter, of which the following is a full, clear, and exact description.

My invention relates to an improvement in photographic shutters, this application being a division of the application for Letters Patent for an improvement in photographic cameras filed by me February 17, 1902, Serial No. 94,475; and the purpose of the invention is to provide an improvement upon the curtain-shutters for which Letters Patent were granted to me November 5, 1901, No. 686,045, whereby through the especial arrangement of the shutter the exposure automatically diminishes as it reaches the sky-line, giving the foreground greater exposure than the sky, and whereby the opening in the shutter regulating the extent of exposure may be quickly, conveniently, and accurately controlled from the exterior of the box, and whereby a small exteriorly-located tension device is provided for the shutter, together with means for accurately setting the exposure-opening in the shutter through the medium of a scale upon the focusing or ground glass.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 2:
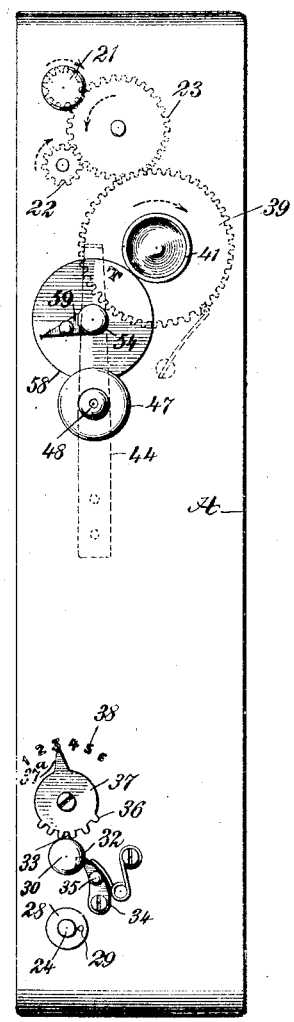
Figure 3:
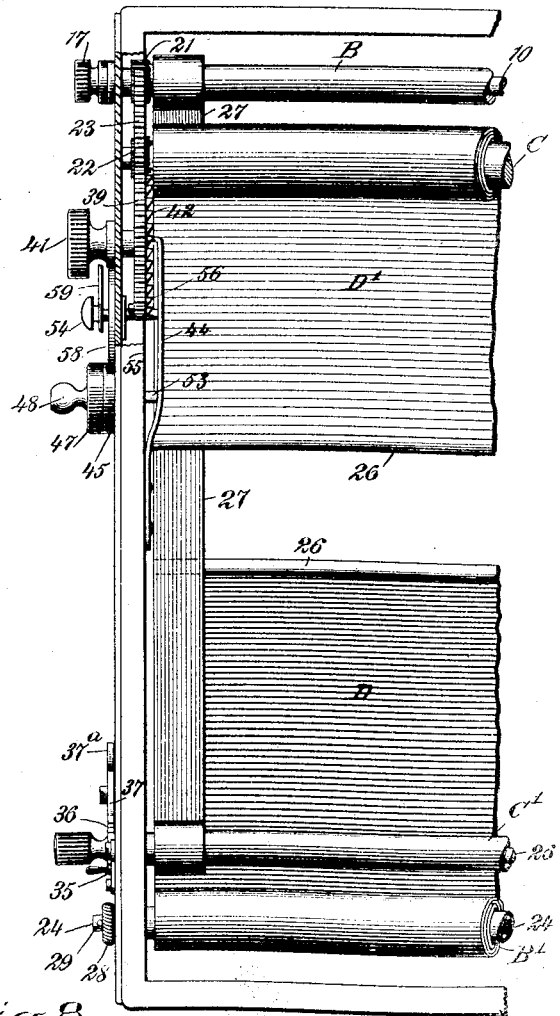
Figure 8:
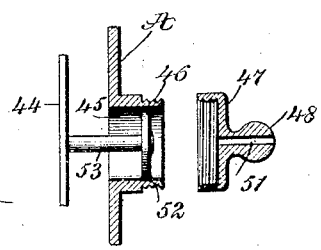

Figure 1 is a perspective view of the improved shutter viewed from the rear. Fig. 2 is a side elevation of the same. Fig. 3 is a partial front elevation of the shutter, parts being in section. Fig. 4 is a detail view of a portion of the mechanism for regulating the opening in the shutter. Fig. 5 is a vertical section through the upper portion of the shutter, illustrating more in detail the mechanism for regulating the opening in the shutter and the connection of said mechanism with that for setting the shutter for time or for instantaneous exposure. Fig. 6 is an edge view of the mechanism for setting the shutter for time or for instantaneous exposure. Fig. 7 is a vertical sectional view taken practically on the line 7 7 of Fig. 6 looking in direction of the arrow. Fig. 8 is a sectional view of the trip device for the shutter, and Fig. 9 is a perspective view of a portion of the shutter drawn upon a smaller scale and illustrating the application of a rear scale for setting the exposure-opening to desired width or for verifying the width of the opening at any time.

A represents the frame for the shutter, which frame is open at the front and at the back. A shaft 10 extends through from side to side of the upper portion of the frame A and through a roller B within the frame. This shaft 10 is capable of end movement in said roller; but the roller is adapted to turn with the shaft, being splined or otherwise attached thereto. Usually at the left-hand end of the shaft 10 a pinion 12 is secured, which meshes with the teeth of an indicating-wheel 13, mounted to turn upon the corresponding side of the frame A and provided upon its outer face with a lug 14, which limits the movement of the wheel in either direction by coming in engagement with a pointer 15, secured to the frame, which pointer extends loosely over a portion of the wheel 13 to a scale of numbers 16, produced thereon—reading, for example, from a fraction of an inch to inches and fractions of the same—and such scale when used in connection with the pointer 15 will indicate the width of the exposure-opening between the opposing edges of the shutter-curtains to be hereinafter described. The variation in the width of the said exposure-opening is brought about by the manipulation of the shaft 10, which at its upper right-hand end is provided with a milled knob or button 17, provided with a pin 18, arranged to enter a series of apertures 19 in the hub 20, forming a part of a pinion 21 within the casing A, as is shown in Fig. 5, which pinion 21 and its hub 20 are loosely mounted on the shaft 10, and said pinion is adapted to mesh with the gearing of a mechanism for determining whether the exposure shall be instantaneous or time 1, which mechanism will be also hereinafter described. When the shaft 10 is to be turned to vary the width of the exposure-opening in the shutter, the width of the opening being read on the scale on the wheel 13, the shaft 10 is drawn out to the right, disengaging the shaft from the pinion 21, so that there will be no effect at such time upon the aforesaid timing mechanism, and after the exposure-opening has been made as large or as small as desired the shaft 10 is reëngaged with the pinion 21. The scale 16 is at one side of the lug 14 and reads preferably from time or full opening near the lug to the smallest desired fractional portion of an inch. A second upper roller C of greater diameter than the roller B is journaled in the frame A a predetermined distance below the roller B, as is shown in Fig. 3, and the right-hand trunnion of the roller C carries a fixed pinion 22, which pinion and the pinion 21 at the right-hand end of the upper roller-shaft 10 mesh with a connecting-gear 23, likewise within the casing A, as is shown in Figs. 2 and 3.

In connection with the upper rollers B and C corresponding spring-rollers B' and C' are employed, preferably of the same diameter as the upper roller B. The rollers B' and C' are carried by shafts 24 and 25, journaled in the bottom portion of the casing A one above the other. The upper roller B and the lower roller B' are respectively distributing and receiving rollers for the rear curtain D of the shutter, and the upper roller C is a receiving-roller and the lower roller C' a distributing-roller for the forward curtain D' of the shutter, which shutter consists of the two curtains D and D'. These curtains will be made of any suitable pliable opaque material and are in close relation to each other. The curtains are preferably directly attached to the receiving-rollers in any suitable manner, and at the opposing edges of the curtains D and D' binding-strips 26, of metal or other stout material, are secured to hold the curtains transversely straight. The bound edges of the curtains D and D' are attached to the distributing-rollers by tapes 27, secured to the side edges of the curtain and to the end portions of the rollers. The spring of the lower receiving-roller B' is placed under a uniform tension sufficient to keep the attached outer or rear curtain D longitudinally taut, and this is accomplished by turning the shaft 24 of said roller until its spring is sufficiently wound and then screwing a nut 28 on the end of the shaft and securing the nut to a side of the frame or casing A by a pin 29 or the like, as is illustrated in Figs. 1, 2, and 3. The two curtains move together through the medium of the pinions 21 and 22 and connecting-gear 23, and in adjusting the curtains to increase or decrease the width of the exposure-opening in the shutter the bound edge of the rear curtain D is moved to or from the corresponding edge of the forward curtain D' by the movement of the shaft 10 of the upper roller B, and the speed at which the shutter shall move is regulated by a tension device applied to the shaft of the distributing-roller C' of the inner curtain D', as is shown in Figs. 1, 2, and 3. The shaft 25, controlling the spring of the said roller C', extends beyond the right-hand side of the casing or frame A, terminating in a knob 30, whereby the shaft may be turned, and a flange 31, which may be a portion of the knob, which flange has a notch 32 therein and a tooth 33. The notch 32 is adapted to receive a spring-controlled pawl 34, pivoted to the frame or casing A and having a small knob 35 to facilitate moving the same, and the tooth 33 engages with the teeth of a toothed sector 36, formed upon the edge of a disk-wheel 37, having a pointer 37$^a$, which pointer travels adjacent to a scale 38 of numbers produced upon the outside of the frame or casing, as is best shown in Fig. 1. The scale 38 indicates the amount of tension to which the spring is subjected, and this scale may be made to read from "1" to "6," as shown, or from "1" to "20" or any desired numeral, the number of teeth carried by the wheel 37 being made to correspond to the numerals in the scale, and the arrangement of the teeth is such and the spring of the roller-shaft C' is so tensioned that in the adjustment of the wheel 37 the shutter may be made to move at a speed ranging, for example, from one-twentieth of a second to one fifteen-hundredth of a second. Supposing the scale on the indicator-wheel 13 to read, for example, from one-eighth of an inch to five inches and the tension-scale 38 to read from "1" to "20," twenty rates of speed may be obtained for each possible division in the width of the shutter-opening. Means are provided whereby the exposure automatically diminishes at the diminishing of the opening in the shutter as it approaches the line of the sky, giving the foreground greater exposure than the sky. This I accomplish by increasing the diameter of the upper roller C, particularly over that of the other upper roller B. Therefore as the curtains jointly move downward to make an exposure the curtain D' will unroll faster to a certain extent from the roller C than will the curtain D from the roller B.

The time mechanism or mechanism whereby the shutter may be set for time or for instantaneous work is best shown in Figs. 2, 3, 6, and 7, in which figures it will be observed that a master gear-wheel 39 is located within the casing at its right-hand side, being secured to a short axle 40, mounted to turn freely in the casing. The axle 40 extends beyond the right-hand side of the casing and terminates at its outer end in a knob 41. The peripheral teeth of the master-wheel 39 mesh with the teeth of the gear 23, connecting the pinions 21 and 22 of the upper rollers B and C, as is particularly shown in Fig. 2, and after the exposure-opening in the shutter has been set to the desired width and also after an exposure the shutter is carried up to its set position and the set tension is placed upon the lower roller C' by turning the master-wheel in one direction, thus bringing about a connected movement of the two upper rollers, as is indicated by the arrows in Fig. 2. The shutter is held in its set position by a spring-pawl 44, the shank of which at its lower end is secured to the inside surface of the right-hand section of the frame A, as is shown in Fig. 3, and the head 44$^a$ of the pawl, which is at the free end of the shank, is normally in engagement with ratchet-teeth 42 upon the inner side surface of the master-wheel 39, adjacent to its periphery, as is also shown in Fig. 3. The ratchet-teeth 42 permit the master-wheel being turned to wind up the shutter while the pawl is in engagement with the teeth, but the shutter cannot move to make an exposure until the pawl is out of engagement with the said ratchet-teeth. The ratchet-teeth extend in a circle on the master-wheel, one closely following the other, except at one point 43, (shown in Fig. 6,) where a space or break occurs of a length corresponding to the length of one of the teeth. In fact, at such point 43 a ratchet-tooth is omitted. The pawl may be disengaged from the ratchet of the master-wheel pneumatically or by the pressure of a finger. This I accomplish through a device shown in Fig. 8, which consists of a collar 45, secured to the frame A in any suitable manner over an opening therein, which collar at its outer end is provided with an external thread 46 to receive the interiorly-threaded portion of a cap 47, having a knob 48 integral therewith to receive an end of a rubber tube 49, at the opposite end of which tube the usual pressure-bulb is located, as is shown in Fig. 1. The knob 48 has an opening 51 therein extending through the inner face of the cap. A piston-head 52 is mounted to slide in the collar 45, and a stem 53, attached to said head, is also secured to the shank of the pawl 44, so that the pawl may be pressed inward by the application of compressed air to the piston-head 52 or when the cap 47 is removed from the collar by pressing the piston-head inward by the finger.

With reference to the detail mechanism for controlling the gearing of the shutter to operate it for instantaneous or for time exposure a push-pin 54 is loosely mounted in the frame A below the master-wheel 39, as is shown particularly in Fig. 6, the inner end of which pin has a swivel connection with the shank of the pawl 44, and within the frame or casing A an arm 55 is secured to the pressure-pin 54, extending beyond opposite sides of the same, adapted in one position, as is shown in positive lines in Fig. 7, to engage with the under sides of the stop-pins 56 and 57, the pin 56 extending from the outer face of the master-wheel near its periphery, while the stop-pin 57 extends inward from the frame A below the push-pin 54. The push-pin 54 passes through a plate 58, secured to the outer right-hand side of the frame A, which plate at one point has the letter "T" produced thereon or a character or symbol designating time, as is shown in Fig. 1, and a pointer 59 is secured to the push-pin 54 near the knob adapted to move over the face of the dial-plate 58 as the push-pin is turned. When the pointer 59 is carried away from the letter "T," for example, to the position shown in Fig. 1, the arm 55 will occupy the position shown in dotted lines in Fig. 7 out of the path of the stop-pin 56 on the master-wheel 39 and out of engagement with the stop-pin 57 on the frame, and the master-wheel when released from the pawl 44 is then free to turn sufficiently to effect an instantaneous exposure. When the pointer 59 is carried to the letter "T" on the dial-plate 58, the arm 54 will be brought to the position shown in positive lines in Figs. 6 and 7, being then in engagement at one end with the stop-pin 57 on the frame or casing, while the other end will be in the path of the stop-pin 56 on the master-wheel when the push-pin is forced inward or is drawn inward by the releasing mechanism for the pawl, so that when the pawl 44 is pushed inward to make an exposure by releasing the master-wheel 39, and the master-wheel 39 turns, it will stop when this pin 56 engages the arm 55, at which time the opening in the shutter will be opposite the center of the exposed plate. When the pawl 44 is relieved from pressure, its head will enter the space or break 43 in the ratchet-teeth of the master-wheel, and as the push-pin 54 is carried outward by the return action of the pawl the arm 55 is carried out of the path of the stop-pin 56 on the master-wheel 39, and as the master-wheel can then move the distance of one ratchet-tooth before the head of the pawl again engages a tooth the master-wheel will have turned sufficiently to carry its stop-pin 56 below the path of the upper end of the arm 54, so that after suitable time has been given for the exposure the pawl can be again pushed inward to release the master-wheel, and the latter will turn without hindrance to close the shutter. It will be observed that the shutter may be released by operating the push-pin 54 on the piston-head 52.

It is evident that in the operation of the shutter to make an exposure as the curtain moves downward the upper or forward curtain D' travels at a slightly-greater speed than the lower or rear curtain, and thus the exposure automatically diminishes as it reaches the sky-line, giving the foreground all the necessary exposure and limiting the exposure at the sky.

In the event that after the exposure-opening in the shutter has been set to a given width and any deviation should occur by reason of frequent and rapid operation of the shutter, such deviation may be detected and corrected by placing a scale 61, in inches or fractions thereof, upon a support at the rear of the shutter and so that the scale can be read with respect to the curtains of the shutter. Usually this scale is produced upon a guide-post 60 for the tapes of the curtains of the shutter, as is shown in Fig. 9, one of which posts is also shown in Fig. 1, and likewise the scale. These posts are at the inner side portions of the frame, just in front of the tapes 27 for the curtain D', and said posts are of any desired width, and the scale is made to read from above downward at the inner sides of the posts, as in fixing the width of the shutter-opening the shutter is rolled upward until the bound edge of the upper curtain is at zero or other designation-mark on the scale at the upper portion of the scale, and then through the operation of the shaft 10 the lower curtain is moved to or from the upper curtain until the bound edge of the lower curtain registers with the proper line or mark on the scale. Thus the scale 61 may be relied upon to fix the opening in the shutter, or after such opening has been determined it may be gaged at any time through the medium of said scale 61. In connection with such a rear scale the ground or focusing glass in the camera to which the shutter is applied is preferably provided with a clear or transparent end section brought opposite the said scale 61, so as to permit an accurate reading of the scale.

Having thus described my invention, I claim as new and desire to secure by Letters Patent—

1. In cameras, a curtain-shutter having a plurality of curtains forming an exposure-opening between adjacent ends, an upper set of plain rollers located one above the other, a lower set of tension-controlled rollers also located one above the other, one curtain being connected with the outer rollers of the two sets and the other curtain with the inner rollers of the sets, all of the rollers having the same diameter with the exception of the lower roller of the upper set, which is of increased diameter, a winding mechanism for the upper rollers, a tension-controlling device for one of the lower rollers, and a releasing device for the wound shutter, which releasing device is capable of being operated manually or pneumatically, as desired.

2. An adjustable curtain-shutter and its curtains, and a scale at the rear of the shutter for indicating the width of the exposure-opening in the shutter, and supports for the said scale independent of the curtains of the shutter, for the purpose specified.

3. A curtain-shutter having a plurality of curtains forming an exposure-opening between adjacent ends, a scale for indicating the width of the exposure-opening, and a support for the scale adjacent to the said curtains, crossing the said exposure-opening and independent of the curtains, the scale being adjacent to the curtains and reading relatively thereto, as described.

4. In camera-shutters, a releasing device for the shutter, consisting of a cylinder open at both ends, a removable cap for one end of the cylinder, provided with an apertured projection to receive a flexible tube, a piston-head having sliding movement in the cylinder, a stem connected with the head, and a locking member for the shutter, connected with the said stem, as described.

5. In cameras, a curtain-shutter having a plurality of curtains forming an exposure-opening between adjacent ends, an upper set of plain rollers located one above the other, a lower set of tension-controlled rollers also located one above the other, one curtain being connected with the outer rollers of the two sets and the other curtain with the inner rollers of the sets, a train of gearing for winding the upper rollers, a master-wheel in connection with said train of gearing and provided with ratchet-teeth upon one face, a locking member for engagement with the ratchet-teeth of the master-wheel, and an exteriorly-operated releasing device for the locking member, as set forth.

6. In cameras, a curtain-shutter having a plurality of curtains forming an exposure-opening between adjacent ends, an upper set of plain rollers located one above the other, a lower set of tension-controlling rollers also located one above the other, one curtain being connected with the outer rollers of the two sets and the other curtain with the inner rollers of the sets, a train of gearing for winding the upper rollers, a master-wheel in connection with said train of gearing and provided with ratchet-teeth upon one face, a spring locking member for engagement with the ratchet-teeth of the master-wheel, a cylinder open at both ends, a removable cap for the said cylinder, provided with an apertured extension to receive the flexible tube, a piston-head mounted in the said cylinder, and a connection between the piston-head and the spring locking members, as described.

7. In a curtain-shutter for cameras, a frame, a plurality of curtains within the frame, forming an exposure-opening between adjacent ends, an upper set of plain rollers located in the said frame one above the other, a lower set of tension-rollers also located within the frame, one above the other, one curtain being connected with the outer rollers of the two sets and the other curtain with the inner rollers of the sets, a train of gearing for winding the upper rollers, a master-gear in connection with the said train of gearing and provided with ratchet-teeth on one face and a stop-pin extending from its opposite face, said ratchet-teeth being circularly arranged with a single break in the arrangement of the teeth of a width substantially equal to the length of a ratchet-tooth, a spring locking member attached to the frame and having a head for engagement with the ratchet-teeth of the master-gear, a push-pin mounted in the frame and connected with the said spring locking member, a stop-pin extending from the frame below the said pin, an arm carried by the push-pin, adapted for engagement with the stop-pin on the master-gear and the stop-pin on the frame in one position of the said push-pin, a dial at the outer part of the frame, and a pointer carried by the outer portion of the push-pin and adapted to travel over the said dial, whereby to regulate the movement of the shutter for time or for instantaneous exposure.

8. In a camera, a curtain-shutter having a plurality of curtains forming an exposure-opening, and exteriorly-operated means substantially as described for regulating the size of the exposure-opening, which means comprise the shaft for the roller of the curtain, the shaft being mounted to slide in the roller and turn therewith, a winding mechanism for the roller, with which the shaft has clutch connection, and an indicator rotated by the movement of the shaft.

9. In a camera, a curtain-shutter having a plurality of curtains forming an exposure-opening, and exteriorly-operated means for regulating the size of the exposure-opening, which means comprise a shaft mounted to slide in one of the curtain-rollers and turn therewith, a winding mechanism for the curtain-rollers, a clutch at one end of the shaft, arranged for engagement with the winding mechanism, a pinion at the opposite end of the shaft, a toothed indicator-wheel exteriorly mounted on the shutter-frame and meshing with the said pinion, and provided with a scale indicating distances, and stop devices for the indicator-wheel, limiting its movement, substantially as described.

10. In a camera, a curtain-shutter having a plurality of curtains forming an exposure-opening, upper and lower sets of rollers for the curtains, a train of gearing connecting the upper set of curtain-rollers, the lower set being tension-controlled, a locking device connected with one end of the shaft of one of the tension-rollers, and an indicator at the exterior of the shutter-frame, operated by the said shaft, for the purpose set forth.

11. In cameras, a curtain-shutter having a plurality of curtains forming an exposure-opening between adjacent ends, an upper set of plain rollers located one above the other, and a lower set of tension-controlled rollers also located one above the other, one curtain being connected with the outer rollers of the two sets and the other curtain with the inner rollers of the sets, all of the rollers having the same diameter with the exception of the lower roller of the upper set which is of increased diameter, a winding mechanism for the upper rollers, a releasing device for the winding mechanism, and a device for indicating the width of the exposure-opening in the shutter, operated by the said winding mechanism, substantially as described.

12. In cameras, a curtain-shutter having a plurality of curtains forming an exposure-opening between adjacent ends, an upper set of gear-controlled rollers connected with one of the ends of the curtains and arranged one above the other, a lower set of tension-controlled rollers also arranged one above the other, all of the rollers being of the same diameter with the exception of the lower roller of the upper set which is of increased diameter, exteriorly-operated means, substantially as described, for regulating the size of the exposure-opening in the shutter, which means comprise a shaft for a roller of the upper set, the shaft being mounted to slide in the roller and turn therewith, a winding mechanism for the roller, with which the shaft has clutch connection, and an indicator rotated by the movement of the shaft, substantially as described.

13. In cameras, a curtain-shutter having a plurality of curtains forming an exposure-opening between adjacent ends, an upper set of gear-controlled rollers connected with one of the ends of the curtains, arranged one above the other, a lower set of tension-controlled rollers also arranged one above the other, all of the rollers being of the same diameter with the exception of the lower roller of the upper set which is of increased diameter, exteriorly-operated means, substantially as described, for regulating the size of the exposure-opening in the shutter, which means comprise a shaft for a roller of the upper set, the shaft being mounted to slide in the roller and to turn therewith, a winding mechanism for the roller, with which the shaft has clutch connection and an indicator rotated by the movement of the shaft, a shaft for one of the tension-controlled rollers, operated from the exterior of the shutter-frame, a stop for the said shaft, a dial adapted to indicate the amount of tension on the roller to which the shaft belongs, which dial is mounted at the exterior of the shutter-frame, and means, substantially as described, for operating the said dial from the said shaft of the tension-controlled roller, for the purposes specified.

14. In a camera-shutter, a frame for the shutter, a releasing device for the shutter, consisting of a sleeve mounted on the frame, being in communication with the interior thereof, a plunger mounted to slide in the said sleeve, a trip device carried by the plunger, and a cap removably covering the said sleeve, the said cap having an apertured projection to receive the tube of a pneumatic apparatus, as and for the purpose set forth.

In testimony whereof I have signed my name to this specification in the presence of two subscribing witnesses.

WILLIAM F. FOLMER.

Witnesses:
JNO. M. RITTER,
J. FRED. ACKER.